United States Patent Office 2,712,015
Patented June 28, 1955

2,712,015

ALLYL ETHERS

Herman A. Bruson, Shaker Heights, Ohio, assignor to Industrial Rayon Corporation, Cleveland, Ohio, a corporation of Delaware No Drawing. Application May 10, 1951,
Serial No. 225,675

13 Claims. (Cl. 260—247.7)

This invention relates to new amino alcohols which are useful for the preparation of fiber-forming copolymers of acrylonitrile which are capable of being formed into fibers having improved dyeing and physical properties.

It is known that homopolymers of acrylonitrile are white, heat resistant, and non-dyeable with acid dyestuffs. In order to impart enhanced dyeing properties to fibers spun from acrylonitrile polymers, it has been the practice to copolymerize certain amines, notably vinylpyridines, with the acrylonitrile. Such copolymers, however, insofar as they contain a sufficient amount of the amine (5–10%) to achieve deep dyeing, possess a pronounced yellow color and a decreased resistance to shrinkage by dry heat. Furthermore, they invariably contain varying amounts of low molecular weight homopolymers and copolymers of the amine which, during wet-spinning operations are leached out by the coagulating bath and redeposited as a brown resinous material which interferes with efficient spinning.

A study of the causes of discoloration of polyacrylonitrile fibers has indicated that certain amines are capable of reacting with acrylonitrile polymers to produce yellow products, whereas others show less tendency to do so.

The object of this invention is to provide a special class of new amines, more specifically certain allyl ethers of amino alcohols which are relatively non-polymerizable alone, but are readily copolymerizable with acrylonitrile to give copolymers from which may be spun improved fibers having enhanced affinity for dyestuffs. In addition, these amino alcohols because of their water-solubility are capable of yielding copolymers with acrylonitrile which are substantially free from traces of unpolymerized amine, and substantially free from homopolymers of the amino alcohols which can deposit as resins on the spinning equipment. In addition, it has been found that these amino alcohols because of their aliphatic character and weak basicity do not readily discolor the acrylonitrile polymers in which they are combined. Finally, because of the presence of certain groups notably hydroxyl groups in these amines, their copolymers with acrylonitrile yield fibers have an enhanced resistance to shrinkage by dry heat.

Copolymers of acryonitrile and allyl ethers of amino alcohols are already described in copending application, Serial No. 133,225, filed December 15, 1949, now Patent No. 2,631,995, issued March 17, 1953.

The new water-soluble amino alcohols which are the object of this invention possess the formula:

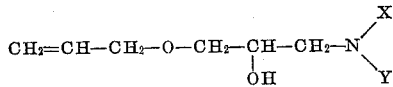

wherein X is a member of the group consisting of hydrogen, alkyl, cycloalkyl, hydroxyalkyl, cyanoalkyl and aminoalkyl radicals; Y is a member of the group consisting of alkyl, cycloalkyl, hydroxyalkyl, cyanoalkyl, aminoalkyl and amino radicals; said hydroxyalkyl and aminoalkyl radicals having at least two carbon atoms between the unsatisfied valence and the hydroxy or amino substituent thereon; and X and Y taken jointly form a saturated heterocyclic radical with the N atoms, said heterocyclic radical being selected from the group consisting of

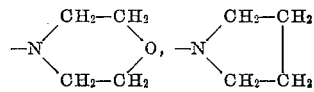

and

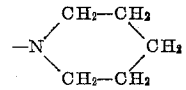

Particularly advantageous amino alcohol compounds are those in which X and Y are members of the group consisting of hydroxyalkyl and cyanoalkyl radicals.

Typical amino alcohols of this invention are, for example, the following:

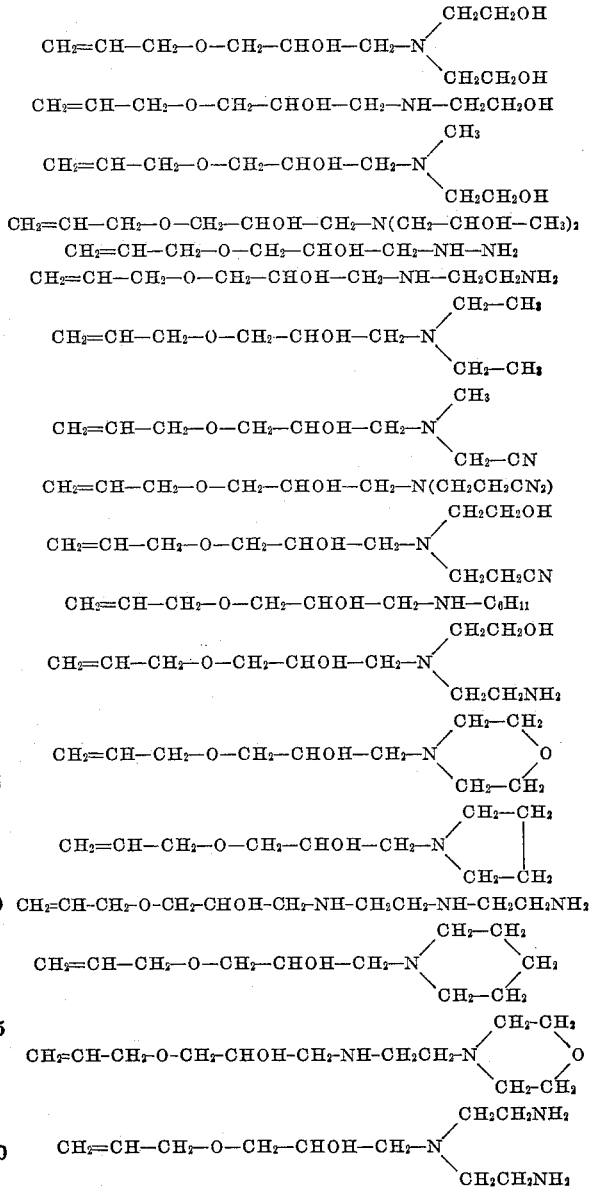

These compounds may be prepared by reacting allyl glyceride ether

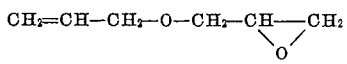

with suitable primary or secondary amines having the formula

wherein X and Y have the significance shown above.

This invention will be more fully described by the following examples, although, it is understood that the invention is not intended to be limited by these examples. In these examples "percent" of materials is intended to mean percent by weight.

*Example I*

To a solution of 30.5 grams of monoethanolamine in 30 grams of water was added dropwise with stirring 57 grams of allyl glycidyl ether during the course of 30 minutes, while the reaction temperature was maintained at about 37–38° C. by occasional cooling.

Upon vacuum distillation of the product, the desired 1-allyloxy-3-(beta-hydroxyethylamino)-propanol-2.

$$CH_2=CH-CH_2-O-CH_2-CHOH-CH_2-NH-CH_2CH_2OH$$

came over at 121° C./0.2 mm. as a colorless liquid. The yield of product was 54 grams.

*Example II*

To a solution of 36 grams of beta-methylaminoethanol and 5 grams of water, was added dropwise with stirring, 52 grams of allyl glycidyl ether during the course of 30 minutes. The reaction temperature was held at 50–60° C. by occasional cooling. The resulting solution was then stirred and heated at about 95° C. for one hour. Upon distillation at reduced pressure there was obtained 78 grams (86% of the theoretical yield) of 1 - allyloxy - 3 - (beta - hydroxyethyl - N - methylamino)-propanol-2

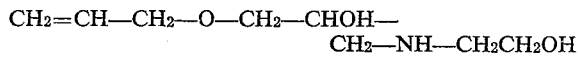

as a colorless liquid B. P. 96–97° C./0.03 mm.

*Example III*

To a solution of 158 grams of diethanolamine and 20 grams of water was added, dropwise with stirring, 171 grams of allyl glycidyl ether over a period of one hour, while maintaining the reaction temperature at 40–50° C. by occasional cooling. The resulting solution was then stirred and heated at about 95° C. for one hour. Upon distillation at reduced pressure 297 grams (90% of the theoretical yield) of 1-allyloxy-3-(bis-beta-hydroxy ethylamino)-propanol-2

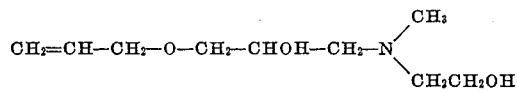

was obtained as a faintly yellow liquid B. P. 170° C./0.3 mm.

*Example IV*

To a stirred mixture of 133 grams of commercial diisopropanolamine (mixed isomers) and 10 grams of water at 60° C. there was added dropwise 114 grams of allyl glycidyl ether at such a rate that the temperature was maintained at about 80° C. After addition was complete, the reaction mixture was stirred and heated at about 95° C. for two hours. The product was distilled at reduced pressure and 215 grams (87% of the theoretical yield) of 1-allyloxy-3-(diisopropanolamino)-propanol-2

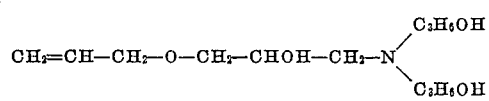

was obtained as a pale yellow liquid B. P. 170–172° C./1 mm.

*Example V*

To 267 grams of 35% aqueous methylamine solution was added with stirring 228 grams of allyl glycidyl ether over a period of 90 minutes. The reaction temperature was maintained at 40–45° C. by occasional cooling. The resulting solution was heated at about 95° C. for 30 minutes and was then distilled under reduced pressure to yield 140 grams of colorless liquid boiling at 120–130° C. (25 mm.). Upon redistillation this yielded 133 grams of 1-allyloxy-3-methylamino-propanol-2 boiling at 118–119° C./23 mm.

To 54 grams of the 1-allyloxy-3-methylamino-propanol-2 in 25 grams of water, there was added dropwise with stirring 42 grams of a 50% aqueous solution of glycolonitrile (HOCH$_2$CN) at such a rate that the temperature did not exceed 50° C. The reaction mixture was then stirred for one hour and the resulting solution distilled at reduced pressure.

The 1-allyloxy-3-(N-methyl-N-cyanomethyl amino)-propanol-2

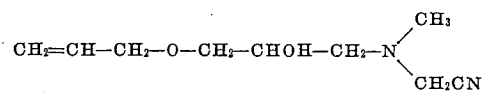

distilled over at 122–123° C. (4 mm.). The yield of product was 60 grams. The redistilled compound boiled at 115° C./0.7 mm.

*Example VI*

A mixture of 171 grams allyl glycidyl ether (1.5 moles) and 123 grams of beta-amino-dipropionitrile

(1 mole) was heated with stirring for 72 hours at about 95° of a steam bath. The excess of allyl glycidyl ether was then stripped off in vacuum at 1 mm. while heating the product at 95–100° C. An almost quantitative yield of 1 - allyloxy-3-(bis-beta-cyanoethyl-amino)-propanol-2

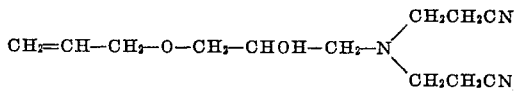

was obtained as a pale amber-colored liquid. Upon distillation under reduced pressure it boiled at 215–220° C. (1 mm.) with decomposition.

*Example VII*

To a solution of 117 grams of 4-amino-4-methyl-2-pentanol in 50 cc. of water, was added dropwise with stirring, 114 grams of allyl glycidyl ether over a period of one hour. The temperature of reaction was maintained below 50° C. by cooling. After all had been added, the mixture was stirred for one hour at room temperature and finally for one hour at about 95° C. The product was distilled under reduced pressure to yield 193 grams of colorless liquid boiling at 110–111° C./0.01 mm. having the formula:

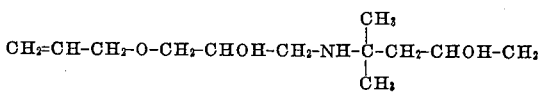

*Example VIII*

To 100 grams of 64% aqueous hydrazine solution (equivalent to two moles of hydrazine) was added, dropwise with stirring, 114 grams (1 mole) of allyl glycidyl ether over a period of two hours. The temperature in the reaction vessel was maintained below 45° C. by means of a cold water bath. The resulting mixture was stirred and heated at about 95° C. for two hours. The low-boiling compounds were removed by distillation at 30 mm. and the residue fractionated to yield 86 grams of 1-allyloxy-3-hydrazino-propanol-2, B. P. 124–125° C./2 mm.

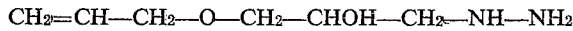

Example IX

To 176 grams (2 moles) of beta-dimethylaminoethylamine containing 15 cc. of water was added, dropwise with stirring, 114 grams (1 mole) of allyl glycidyl ether over a period of 100 minutes. The temperature in the reaction vessel was maintained at about 40° C. by occasional application of a cold-water bath. The resulting mixture was stirred and heated at about 95° C. for two hours. The low-boiling compounds were removed at 30 mm. and the residue fractionated to yield 108 grams of 1-allyloxy-3 - (beta - dimethylaminoethylamino) - propanol-2, B. P. 119.5–120.5° C./2 mm.

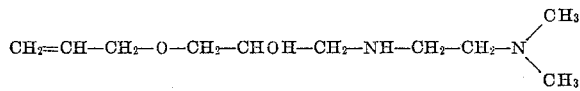

Example X

To 120 grams (0.92 mole) of beta-aminoethylmorpholine containing 15 ml. of water was added, dropwise with stirring, 114 grams (1 mole) of allyl glycidyl ether over a period of two and one-half hours. The temperature in the reaction vessel was maintained below 50° C. by occasional application of a cold water bath. The resulting mixture was stirred and heated at about 95° C. for three hours and then the low-boiling compounds removed at the water pump. The residue was fractionated to yield 103 grams of 1-allyloxy-3-(beta-N-morpholinoethylamino)-propanol-2, B. P. 148–150° C./0.8 mm.

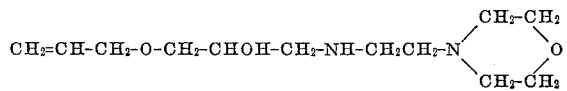

Example XI

To a solution of 309 grams (3 moles) of diethylenetriamine in 100 ml. of water was added, dropwise with stirring, 114 grams (1 mole) of allyl glycidyl ether over a period of 100 minutes. The temperature in the reaction vessel was maintained at 50–53° C. by occasional cooling with a cold water bath. The resulting mixture was then stirred and heated at about 95° C. for two hours. The low-boiling compounds were removed by distillation at 30 mm. and the residue fractionated in high vacuum to yield 156 grams of monosubstituted product, B. P. 120–2° C./0.01 mm. having either of the following structures:

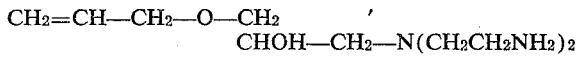
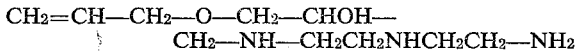

Example XII

To a solution of 104 grams (1 mole) of 2-aminoethylethanolamine and 22 cc. of water was added, dropwise with stirring, 114 grams (1 mole) of allyl glycidyl ether over a period of about one hour. The temperature in the reaction vessel was maintained at approximately 40° C. by occasional cooling with a cold water bath. The resulting mixture was then stirred and heated at about 90° C. for 2½ hours. Following removal of the low-boiling compounds on the water pump, the residue was fractionated to yield 98 grams of 1-allyloxy-3(beta-hydroxyethylaminoethylamino)-propanol-2, B. P. 145–6° C./0.02 mm.

Example XIII

One mole (114 grams) of allyl glycidyl ether was added, dropwise with stirring, to one mole (102 grams) of 3-dimethylaminopropylamine which contained a few cc. of water. The temperature was maintained at 50–60° C. during the addition which took one hour. The resulting mixture was then stirred and heated at 90–95° C. for 2½ hours. The low-boiling compounds were removed by distillation at 25 mm. The residue was fractionated to yield 64 grams of 1-allyloxy-3-(gamma-dimethylaminopropylamino)- propanol-2, B. P. 133–4° C./4 mm.

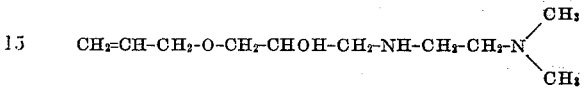

Example XIV

To a solution of 180 grams (3 moles) of ethylene diamine in 100 cc. of water warmed to 50° C. was added, dropwise with stirring, 114 grams (1 mole) of allyl glycidyl ether over a period of two hours. The temperature was maintained at 50–55° C. by occasional cooling. The resulting solution was partially evaporated at about 95° C. and 20 mm. The amber residue was distilled to yield 126 grams of 1-allyloxy-3-(beta-aminoethylamino)-propanol-2, B. P. 126–8° C./3 mm.

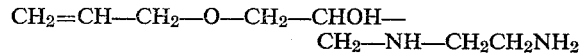

Example XV

Fifty-seven grams (0.5 mole) of allyl glycidyl ether was added, dropwise with stirring, to a solution of 43.5 grams (0.5 mole) of morpholine and 10 cc. of water over a period of 30 minutes. The amine solution was warmed to about 55° C. initially and the temperature maintained between about 52° to 58° C. during the reaction. After stirring 30 minutes longer, the reaction mixture was distilled to yield 96 grams of 1-allyloxy-3-morpholino-propanol-2, B. P. 93° C./0.4 mm.

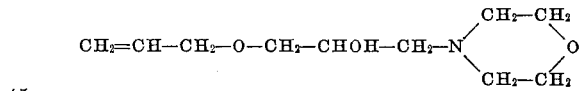

The use of the compounds of this invention in the preparation of copolymers is claimed in the application of Herman A. Bruson, Serial No. 133,225, filed December 15, 1949, now Patent No. 2,631,995, issued March 17, 1953.

I claim:

1. A water-soluble amino alcohol having the formula

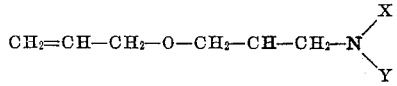

wherein X is a member of the group consisting of hydrogen, alkyl, cycloalkyl, hydroxyalkyl, cyanoalkyl and aminoalkyl radicals; Y is a member of the group consisting of alkyl, cycloalkyl, hydroxyalkyl, cyanoalkyl, aminoalkyl and amino radicals; said hydroxyalkyl and aminoalkyl radicals having at least two carbon toms between the unsatisfied valence and the hydroxy or amino substituent thereon; and X and Y taken jointly form a saturated heterocyclic radical with the N atom, said heterocyclic radical being selected from the group consisting of

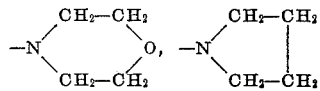

and

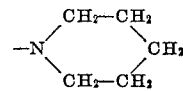

2. A water-soluble amino alcohol having the formula

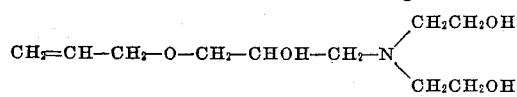

3. A water-soluble amino alcohol having the formula
$CH_2=CH—CH_2—O—CH_2—CHOH—CH_2—NH—CH_2CH_2OH$ 4. A water-soluble amino alcohol having the formula
$CH_2=CH—CH_2—O—CH_2—CHOH—CH_2—NH—CH_2CH_2NH_2$ 5. A water-soluble amino alcohol having the formula

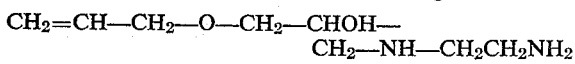

6. A water-soluble amino alcohol having the formula

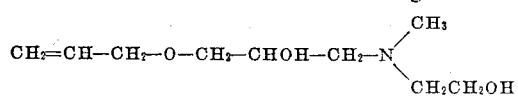

7. A method for preparing a water-soluble amino alcohol which comprises heating a mixture comprising allyl glycidyl ether and a primary or secondary amine having the formula

wherein X is a member of the group consisting of hydrogen, alkyl, cycloalkyl, hydroxyalkyl, cyanoalkyl and aminoalkyl radicals; Y is a member of the group consisting of alkyl, cycloalkyl, hydroxyalkyl, cyanoalkyl, aminoalkyl and amino radicals; said hydroxyalkyl and aminoalkyl radicals having at least two carbon atoms between the unsatisfied valence and the hydroxy or amino substituent thereon; and X and Y taken jointly form a saturated heterocyclic radical with the N atom said heterocyclic radical being selected from the group consisting of

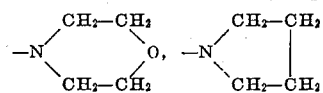

and

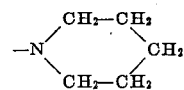

8. A method for preparing a water-soluble amino alcohol which comprises heating a mixture comprising allyl glycidyl ether and diethanol amine.

9. A method for preparing a water-soluble amino alcohol which comprises heating a mixture comprising allyl glycidyl ether and monoethanol amine.

10. A method for preparing a water-soluble amino alcohol which comprises heating a mixture comprising allyl glycidyl ether and ethylene diamine.

11. A method for preparing a water-soluble amino alcohol which comprises heating a mixture comprising allyl glycidyl ether and beta-methylamino-ethanol.

12. A method for preparing a water-soluble amino alcohol which comprises heating a mixture comprising allyl glycidyl ether and morpholine.

13. A water-soluble amino alcohol having the formula

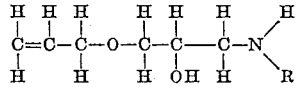

in which R is a lower alkyl radical.

References Cited in the file of this patent

UNITED STATES PATENTS 2,302,388    Hester    Nov. 17, 1942